(12) United States Patent
Sprouse et al.

(10) Patent No.: US 7,111,463 B2
(45) Date of Patent: Sep. 26, 2006

(54) COMBUSTION WAVE IGNITION FOR COMBUSTORS

(75) Inventors: Kenneth M Sprouse, Northridge, CA (US); Shahram Farhangi, Woodland Hills, CA (US)

(73) Assignee: Pratt & Whitney Rocketdyne Inc., Canoga Park, CA (US)

( * ) Notice: Subject to any disclaimer, the term of this patent is extended or adjusted under 35 U.S.C. 154(b) by 110 days.

(21) Appl. No.: 10/763,764

(22) Filed: Jan. 23, 2004

(65) Prior Publication Data

US 2005/0160717 A1 Jul. 28, 2005

(51) Int. Cl.
- F02C 7/26 (2006.01)
- F02C 7/264 (2006.01)
- F02C 7/228 (2006.01)
- F02C 5/00 (2006.01)

(52) U.S. Cl. ............... 60/776; 60/39.37; 60/39.76; 60/39.826

(58) Field of Classification Search ......... 60/39.826, 60/39.76, 39.37, 787, 786, 39.821, 776, 39.38
See application file for complete search history.

(56) References Cited

U.S. PATENT DOCUMENTS

| | | | | |
|---|---|---|---|---|
| 2,722,800 A | * | 11/1955 | Jubb et al. | 60/39.826 |
| 2,811,676 A | * | 10/1957 | Smits | 60/39.821 |
| 3,009,321 A | * | 11/1961 | Jones et al. | 60/39.821 |
| 3,674,409 A | * | 7/1972 | Desty | 431/1 |
| 4,731,989 A | | 3/1988 | Furuya et al. | |
| 4,870,824 A | | 10/1989 | Young | |
| 5,281,128 A | | 1/1994 | Dalla Betta et al. | |
| 5,309,637 A | | 5/1994 | Moriarty | |
| 5,461,864 A | | 10/1995 | Betta et al. | |
| 5,511,972 A | | 4/1996 | Dalla Betta et al. | |
| 5,512,250 A | | 4/1996 | Dalla Betta et al. | |
| 5,518,697 A | | 5/1996 | Dalla Betta et al. | |
| 5,577,906 A | | 11/1996 | Hanakata et al. | |
| 5,636,511 A | * | 6/1997 | Pfefferle et al. | 60/39.826 |
| 5,709,077 A | | 1/1998 | Beichel | |
| 5,715,673 A | | 2/1998 | Beichel | |
| 5,791,889 A | * | 8/1998 | Gemmen et al. | 60/39.76 |
| 5,899,679 A | | 5/1999 | Euzen et al. | |
| 5,937,635 A | * | 8/1999 | Winfree et al. | 60/39.78 |
| 5,956,937 A | | 9/1999 | Beichel | |
| 5,970,702 A | | 10/1999 | Beichel | |
| 6,170,264 B1 | | 1/2001 | Viteri et al. | |
| 6,174,159 B1 | | 1/2001 | Smith et al. | |
| 6,192,688 B1 | | 2/2001 | Beebe | |

(Continued)

FOREIGN PATENT DOCUMENTS

EP 0 304 707 5/1988

(Continued)

OTHER PUBLICATIONS

"X-33 Combustion-Wave Ignition System Tested", http://www.grc.nasa.gov/WWW/RT1998/5000/5830liou.html, 3 pages, Jun. 1999 (printed Nov. 2, 2004).

(Continued)

*Primary Examiner*—Ted Kim
(74) *Attorney, Agent, or Firm*—Harness Dickey & Pierce P.L.C.

(57) ABSTRACT

A system, such as a turbine power production system, including a plurality of combustion chambers. The combustion chamber may be provided with an ignition system that allows for substantially simultaneous ignition of each of the plurality of the combustors. Generally, a detonation wave may be provided to each of the combustion chambers substantially simultaneously from a single ignition combustion wave chamber.

18 Claims, 8 Drawing Sheets

U.S. PATENT DOCUMENTS

| | | |
|---|---|---|
| 6,202,402 B1 | 3/2001 | Sattelmayer |
| 6,205,768 B1 | 3/2001 | Dibble et al. |
| 6,358,040 B1 | 3/2002 | Pfefferle et al. |
| 6,415,608 B1 | 7/2002 | Newburry |
| 6,584,760 B1 | 7/2003 | Lipinski et al. |
| 2002/0139119 A1 | 10/2002 | Touchton et al. |
| 2003/0056519 A1 | 3/2003 | Newberry |

FOREIGN PATENT DOCUMENTS

| | | |
|---|---|---|
| EP | 0 889 289 | 6/1998 |
| JP | 58-179730 | 10/1983 |
| JP | 59-107119 | 6/1984 |
| JP | 60-66022 | 4/1985 |
| JP | 60-64131 | 12/1985 |
| WO | WO 02/27243 | 4/2002 |

OTHER PUBLICATIONS

Catalytica, How it Works, http://www.catalyticaenergy.com/xonon/how_it_works.html, printed Feb. 6, 2002.

Catalytica, How it Works, http://www.catalyticaenergy.com/xonon/how_it_works1.html, printed Feb. 6, 2002.

* cited by examiner

COMBUSTION WAVE IGNITION FOR COMBUSTORS

FIELD

The present invention relates generally to gas powered turbines for generating power, and more particularly to a substantially simultaneous ignition of a plurality of combustors of a gas powered turbine system.

BACKGROUND

It is generally known in the art to power turbines with gases being expelled from combustion chambers. These gas powered turbines can produce power for many applications such as terrestrial power plants. In the gas powered turbine a fuel is combusted in an oxygen rich environment. The fuel may be any appropriate fuel such as a liquid or gas. Exemplary fuels include hydrocarbons (for example methane or kerosene) or hydrogen. Generally, these combustion systems may emit undesirable compounds such as nitrous oxide compounds (NOX) and carbon containing compounds. It is generally desirable to decrease various emissions as much as possible so that selected compounds may not enter the atmosphere. In particular, it has become desirable to reduce NOX emissions to a substantially low amount. Emissions of NOX are generally desired to be near zero, and are accepted to be near or at zero, if they are equal to or less than about one part per million volume of dry weight emissions.

A combustion chamber fuel, such as methane, is combusted in atmospheric air where temperatures generally exceed about 1427° C. (about 2600° F.). When temperatures are above 1427° C., the nitrogen and oxygen compounds, both present in atmospheric air, undergo chemical reactions which produce nitrous oxide compounds. The energy provided by the high temperatures allows the breakdown of dinitrogen and dioxygen, especially in the presence of other materials such as metals, to produce NOX compounds such as $NO_2$ and NO.

It has been attempted to reduce NOX compounds by initially heating the air before it enters the combustion chambers to an auto-ignition temperature. If the air enters the combustion chamber at an auto-ignition temperature, then no flame is necessary to combust the fuel. Auto-ignition temperatures are usually lower than pilot flame temperatures or the temperatures inside recirculation flame holding zones. If no flame is required in the combustion chamber, the combustion chamber temperature is lower, at least locally, and decreases NOX emissions. One such method is to entrain the fuel in the air before it reaches the combustion chamber. This is done substantially continuously throughout operation of the combustor. The air or oxidizer must be heated with pre-burning to operate at all. This vitiated air, that is air which includes the fuel, is then ignited in a pre-burner to raise the temperature of the air before it reaches the main combustion chamber. This decreases NOX emissions substantially. Nevertheless, NOX emissions still exist due to the initial pre-burning. Therefore, it is desirable to decrease or eliminate this pre-burning, thereby substantially eliminating all NOX emissions.

Although the air is heated before entering the main combustion chamber, it may still be ignited in the combustion chamber to combust the remaining fuel. Therefore, an additional flame or arc is used to combust remaining fuel in the main combustion chamber. Again the flame or arc is generally always required to maintain combustion. This reduces the temperature of the igniter, but still increases the temperature of the combustion chamber. In addition, no fuel is added to the air as it enters the combustion chamber. Rather all the fuel has already been entrained in the air before it enters the combustion chamber to be combusted. This greatly reduces control over where combustion occurs and the temperature in the combustion chamber.

Other attempts to lower NOX emissions include placing catalysts in catalytic converters on the emission side of the turbines. This converts the NOX compounds into more desirable compounds such as dinitrogen and dioxygen. These emission side converters, however, are not one hundred percent efficient thereby still allowing NOX emissions to enter the atmosphere. The emission converters also use ammonia $NH_3$, gas to cause the reduction of NOX to $N_2$. Some of this ammonia is discharged into the atmosphere. Also, these converters are expensive and increase the complexity of the turbine and power production systems. Therefore, it is also desirable to eliminate the need for emission side catalytic converters.

Furthermore, it may be desirable to provide substantially simultaneous ignition of a plurality of combustors. This may reduce undesirable emissions, while increasing longevity of the system. For example, if only a limited number of a selected number of combustors are ignited at once and a combustion or shock wave is used to ignite the others, substantial back pressures and undesirable stresses may be exerted on the system. Therefore, igniting each of the combustors substantially simultaneously may decrease the stress placed on the system and increase the efficiency of the start up, thereby decreasing selected emissions.

SUMMARY

A device and system for providing substantially simultaneous ignition to a plurality of combustors. Generally, a plurality of combustors may be provided in a selected system, such as a gas powered turbine. Each of the combustors combusts a selected amount of fuel in an oxidizer to produce the expanding gases to power the gas powered turbine. The system allows a substantially single spark, preburner, or chamber to combust a selected amount of fuel, which then propagates along a selected line to provide a combustion wave to a selected combustor. The preburner allows for the formation of a wave, which as it propagates becomes a combustion wave, such that a selected fuel and oxidizer provided at a point in the line will be ignited by the combustion wave. Therefore, a plurality of pilot flames may be produced by a single combustion chamber.

Further areas of applicability may become apparent from the detailed description provided hereinafter. It should be understood that the detailed description, while indicating the various embodiments of the invention, are intended for purposes of illustration only and are not intended to limit the scope of the disclosure of the appended claims.

BRIEF DESCRIPTION OF THE DRAWINGS

The present description may become more fully understood from the accompanying drawings, wherein.

DETAILED DESCRIPTION OF VARIOUS EMBODIMENTS

The following description of various embodiments is merely exemplary in nature and is in no way intended to limit the invention, its application, or uses. For example, although the following combustor and systems are described in conjunction with a terrestrial gas turbine, each and/or all may be used in other systems. The pre-mixer and heat exchanger may be used in systems other than turbine systems. Also a simultaneous ignition system may be used in any appropriate combustion or turbine system.

Figure 1:
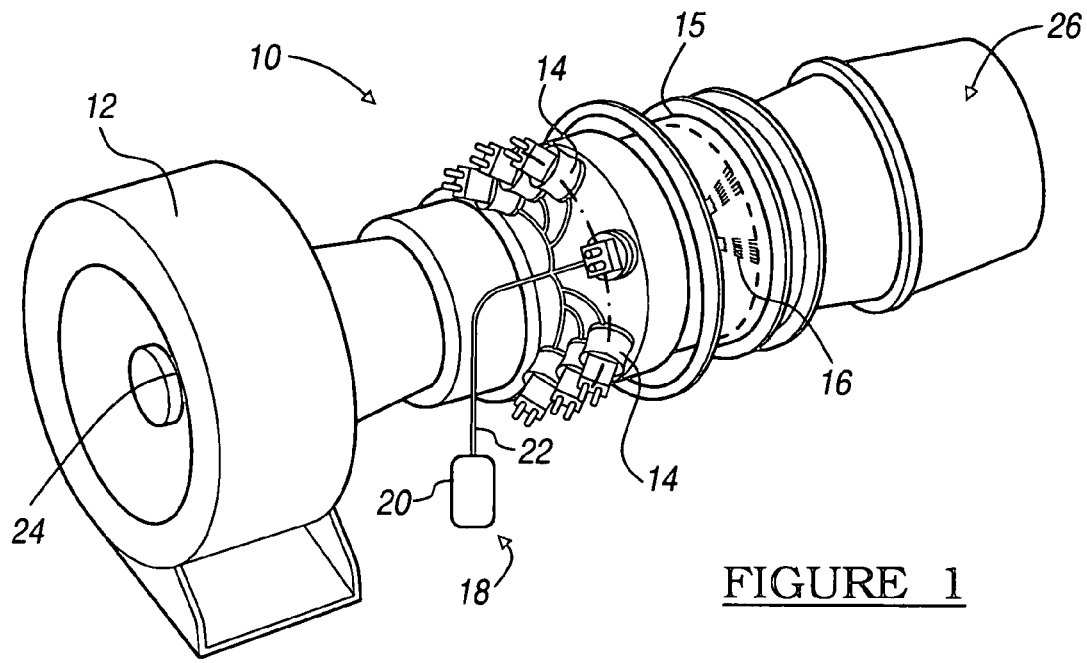
FIG. 1 is a perspective view of a gas powered turbine including a combustor in accordance with the present invention.

Referring to FIG. 1, a gas powered turbine 10 in accordance with various embodiments is shown. The gas powered combustion turbine 10 may use any appropriate fuel that may be combusted and may expand to move portions of the gas powered turbine 10 to produce power. The gas powered turbine 10 also may include a compressor 12 that forces atmospheric air into the gas powered turbine 10. The gas powered turbine 10 may include several combustion chambers 14 for combusting the fuel in a selected oxidizer. The combusted fuel is used to drive a turbine 15 including turbine blades 16 which are axially displaced in the turbine 15. There are generally a plurality of turbine blades 16, however, the actual number depends upon various factors, such as the power the gas powered turbine 10 is to produce. Only a single turbine blade is illustrated for clarity.

In general, the gas powered turbine 10 ingests atmospheric air, combusts a fuel in it, this produces expanding gases that power the turbine blades 16. Air may be pulled in and compressed with the compressor 12, which generally includes a plurality of concentric fans which grow progressively smaller along the axial length of the compressor 12. The fans in the compressor 12 may be powered by a single axle. The high pressure air then enters the combustion chambers 14 where the fuel is added and combusted. Once the fuel is combusted, it expands out of the combustion chamber 14 and engages the turbine blades 16 which, due to aerodynamic and hydrodynamic forces, spins the turbine blades 16. The gases form an annulus that spin the turbine blades 16, which are affixed to a shaft (not shown). Generally, there are at least two turbine blades 16. One or more of the turbine blades 16 engage the same shaft that the compressor 12 engages.

A start up or ignition system 18 is also provided. The ignition system 18 generally includes a combustion wave premix chamber 20 and a pilot line 22. The ignition system 18 is illustrated here diagrammatically, for simplicity, and is discussed in detail herein. Nevertheless, the ignition system 18 generally allows for ignition or start up of each of the combustors 14 of the plurality provided on the gas powered turbine 10 for substantially simultaneous ignition of the gas powered turbine 10.

The gas powered turbine 10 may be self-powered since the spinning of the turbine blades 16 also powers the compressor 12 to compress air for introduction into the combustion chambers 14. Other turbine blades 16 are affixed to a second shaft 24 which extends from the gas powered turbine 10 to power an external device. After the gases have expanded through the turbine blades 16, they are expelled out through an exhaust port 26. It will be understood that the gas powered turbine 10 may be used for many different applications such as engines for vehicles and aircraft or for power production in a terrestrially based gas powered turbine 10.

The gases that are exhausted from the gas powered turbine 10 include many different chemical compounds that are created during the combustion of the atmospheric air in the combustion chambers 14. If only pure oxygen and pure hydrocarbon fuel, were combusted, absolutely completely and stoichiometrically, then the exhaust gases would include only carbon dioxide and water. Atmospheric air, however, is not 100% pure oxygen and includes many other compounds such as nitrogen and other trace compounds. Therefore, in the high energy environment of the combustion chambers 14, many different compounds may be produced. All of these compounds exit the exhaust port 26.

It is generally known in the art that an equivalence ratio is determined by dividing the actual ratio of fuel and air by a stoichiometric ratio of fuel to air (where there is not an excess of one starting material). Therefore, a completely efficient combustion of pure fuel and oxygen would equal an equivalence ratio of one. It will be understood that although atmospheric air in a hydrocarbon fuel may be preferred for economic reasons other oxidizers and fuels may be provided. The air may provide an oxidizer for the fuel.

It will be understood that the gas powered turbine 10 may include more than one combustion chamber 14. Any reference to only one combustion chamber 14, herein, is for clarity of the following discussion alone. Various embodiments may be used with any oxidizer or fuel that is used to power the gas powered turbine 10. Moreover, the combustor 14 may combust any appropriate fuel. Air is simply an exemplary oxidizer and hydrocarbons an exemplary fuel.

The fuel that may be combusted in the gas powered turbine 10 may be any appropriate fuel. The fuel may be liquid or gaseous depending upon various considerations and applications. In addition, the fuel may be any appropriate material that may be combusted in a selected oxidizer, such as oxygen and atmospheric air. For example, the fuel may be a hydrocarbon fuel such as methane, kerosene, synthesis gas (selected mixtures of hydrogen and carbon monoxide), and other appropriate hydrocarbon fuels. In addition, the fuel may be hydrogen or other appropriate fuels. The hydrogen may be formed in any appropriate manner and provided to the gas powered turbine 10 to combust in the oxidizer to power the turbine blades 16.

Figure 2:
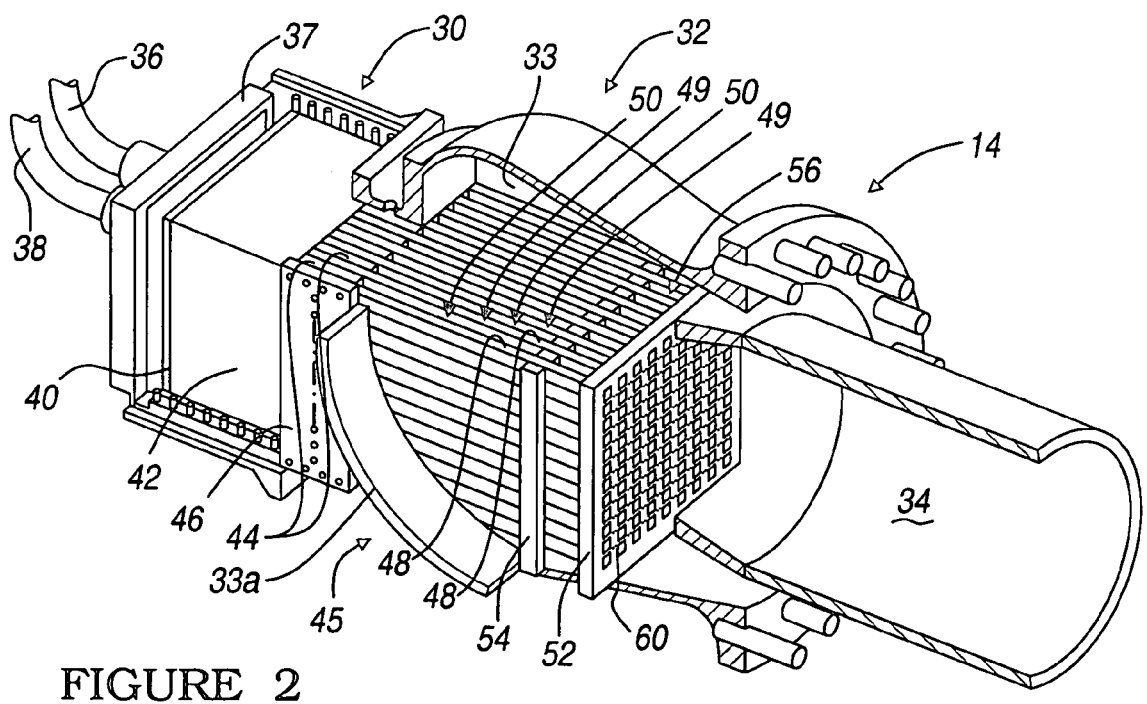
FIG. 2 is a partial cross-sectional perspective view of a single combustor.

With reference to FIG. 2, an exemplary combustion chamber 14 is illustrated. The combustion chamber may comprise any appropriate combustion chamber such as the one described in U.S. patent application Ser. No. 10/120,268 filed Apr. 10, 2002 entitled, "A Catalytic Combustor For Substantially Eliminating Nitrous Oxide Emissions," incorporated herein by reference. The combustion chamber 14 may include a premix section or area 30, a heat exchange or pre-heat section 32, generally enclosed in a heat exchange chamber 33, and a main combustion section 34. A first or premix fuel line 36 may provide fuel to the premix area 30 through a fuel manifold 37 and a second or main fuel line 38 may provide fuel to the main combustion section 34 through a main injector 52. Positioned in the premix area 30 is a premix injector 40 which injects fuel from the first fuel line 36 into a premix chamber or premixer 42. Air from the compressor 12 enters the premix area 30 through a plurality of cooling tubes 44 of a heat exchanger or pre-heater 45 (detailed in FIG. 3). The premix chamber 42 encompasses a volume between the premix injector 40 and an outlet of the cooling tubes 44.

With further reference to FIG. 2, a plurality of catalytic heat exchange or catalyst tubes 48 extend into the heat exchange area 32. The heat exchange tubes 48 are spaced laterally apart. The heat exchange tubes 48, however, are not spaced vertically apart. This configuration creates a plurality of columns 49 formed by the heat exchange tubes 48. Each heat exchange tube 48, and the column 49 as a whole, define a heat exchanger or catalyst pathway for air to travel through. The columns 49 define a plurality of channels 50. It will be understood this is simply exemplary and the tubes may be spaced in any configuration to form the various pathways. Extending inwardly from the walls of the heat exchange chamber 33 may be a directing fin 33*a*. The directing fin 33*a* may direct the flow of air to the top and the bottom of the heat exchange chamber 33 so that air may be directed to flow through the channels 50 defined by the heat exchange tubes 48. It will be understood by one skilled in the art that any appropriate number of the directing fin 33*a* and configuration may be used. It will also be understood that the fin 33*a* is not necessary and the air may be directed by hydraulic flow and the heat exchanger chamber 33.

Figure 3:
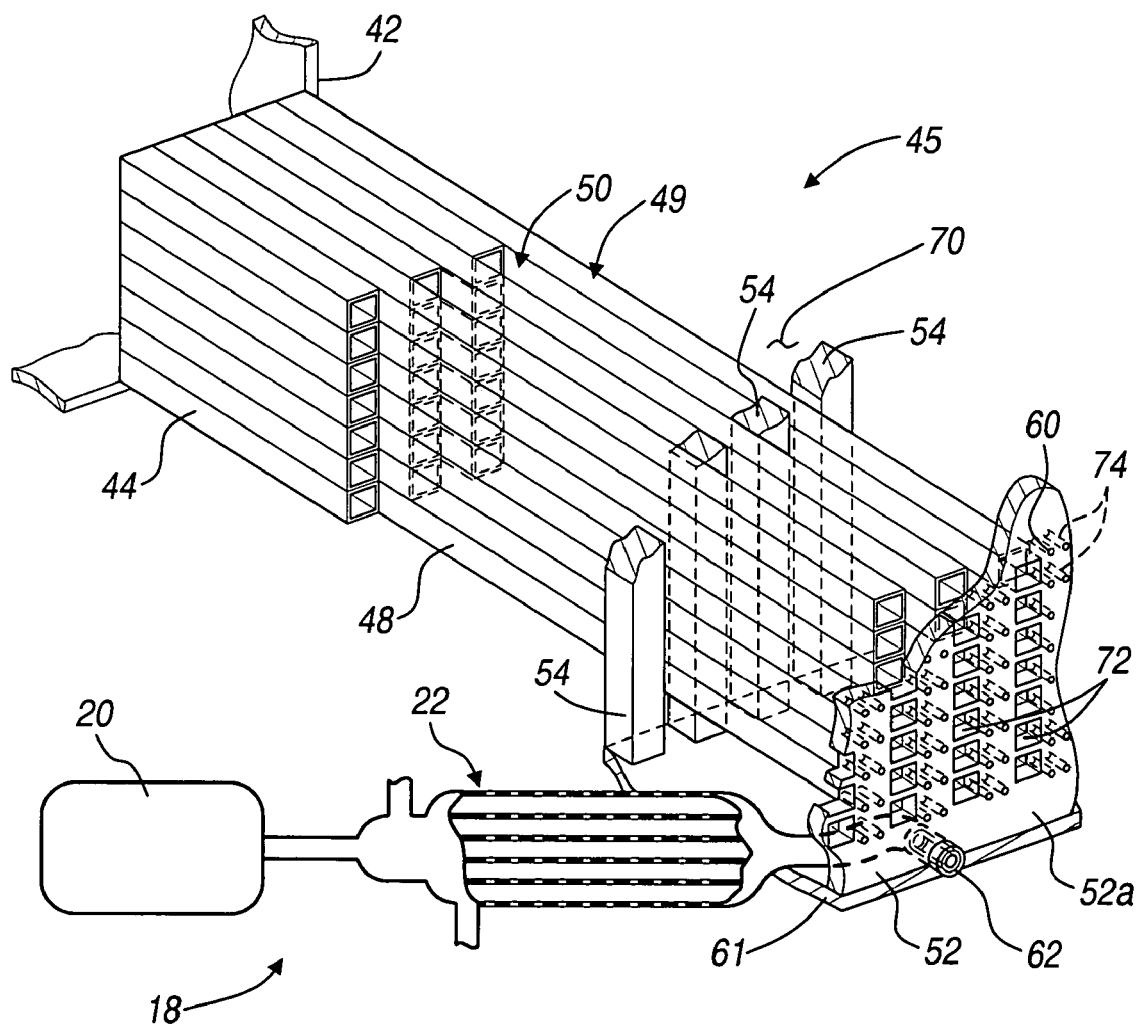
FIG. 3 is a detailed, partial cross-sectional, perspective view of a portion of the heat exchanger.

With continuing reference to FIG. 2 and reference to FIG. 3, near the ends of the heat exchange tubes 48, where the heat exchange tubes 48 near the main combustion section 34, is a main injector 52. The second fuel line 38 provides fuel to the main injector 52 so that fuel may be injected at the end of each heat exchange tube 48. Spaced away from the main injector 52, towards the premix area 30, is an intra-propellant plate 54. The intra-propellant plate 54 separates the air that is traveling through the channels 50 and the fuel that is being fed to the fuel manifold region 56 between the main injector face 52 and the intra-propellant plate 54. It will be understood, that the intra-propellant plate 54 is effectively a solid plate, though not literally so in various embodiments and not illustrated here as a single solid plate. The placement of the heat exchange tubes 48 may dictate that the intra-propellant plate 54 be segmented wherein one portion of the intrapropellant plate 54 is placed in each channel 50 between two columns 49.

Air that exits the heat exchange tubes 48 is entrained with fuel injected from an injector port 60 in the main injector 52 and this fuel then combusts in the main combustion section 34. The injectors 60 may be any appropriate injector or injector element. For example, the injector 60 may be impinging injectors, such as those illustrated and described in U.S. patent application Ser. No. 10/397,394, entitled "A CATALYTIC COMBUSTOR AND METHOD FOR SUBSTANTIALLY ELIMINATING NITROUS OXIDE EMISSIONS", and commonly assigned and incorporated herein by reference. A further injector element that may be injector 60 includes the injector element described in U.S. patent application Ser. No. 10/729,679, entitled "A Fuel Injection Method and Apparatus for a Combustor", and commonly assigned and incorporated herein by reference. Therefore, the injector 60 may be any appropriate injector and the above are merely examples of injectors that may be used in the combustor 14. The main combustion section 34 directs the expanding gases of the combusted fuel to engage the turbine blades 16 so that the expanded gases may power the turbine blades 16.

A detailed portion of the heat exchanger 45 is illustrated in FIG. 3. Although, in various embodiments the heat exchanger 45 includes a large plurality of tubes, as generally shown in FIG. 2, only a few of the heat exchange tubes 48 and cooling tubes 44 are illustrated here for greater clarity. The heat exchanger 45 may be similar to that described in U.S. Pat. No. 5,309,637 entitled "Method of Manufacturing A Micro-Passage Plate Fin Heat Exchanger", incorporated herein by reference. The heat exchanger 45 includes a plurality of the cooling tubes 44 disposed parallel to and closely adjacent the heat exchange tubes 48. Each of the cooling tubes 44 and the heat exchange tubes 48 may have a generally rectangular cross section and can be made of any appropriate material such as one having a generally good thermally conductivity. For example, the heat exchange tubes 48 and the cooling tubes 44 may be formed of stainless steel. It will be appreciated that while the cooling tubes 44 and the heat exchange tubes 48 are shown as being substantially square, the cross-sectional shape of the components could comprise a variety of shapes other than square. Without being bound by the theory, it is believed that the generally square shape may provide a good thermal transfer between the tubes 44 and 48.

Both the cooling tubes 44 and the heat exchange tubes 48 may be of any appropriate size and may be generally square in cross-section having a width and height of about 0.04 inches to about 1.0 inches (between about 0.1 centimeters to about 2.5 centimeters). The thickness of the walls of the cooling tubes 44 and the heat exchange tubes 48 may be any appropriate thickness. The walls may be strong enough to allow the fluids to flow through them, but still allow for an efficient transfer of heat between the inside of the heat exchange tubes 48 and the air in the channels 50 and cooling tubes 44. The thickness may also vary according to various reasons such as size and material choice.

The cooling tubes 44 extend parallel to the heat exchange tubes 48 for a portion of the length of the heat exchange tubes 48. As discussed above, the heat exchange tubes 48 generally define a pathway that may be a catalyst or heat exchange pathway. The cooling tubes 44 also define a pathway that is generally a cooling pathway. The cooling tubes 44 may also define a portion of the heat exchange pathway as the oxidizer, such as the compressed atmospheric air, travels past the heat exchange tubes 48 through the heat exchanger 45.

Generally, each of the cooling tubes 44 is brazed to one of the heat exchange tubes 48 for the distance that they are placed adjacent one another. Moreover, the cooling tubes 44 and the heat exchange tubes 48 may be brazed to an adjacent tube of the same type. The cooling tubes 44 extend between the columns 49 of the heat exchanger tubes 48. According to various embodiments, brazing materials are those with melting temperatures above about 538° C. (about 1000° F.). The cooling tubes 44 extend between the columns 49 of the heat exchanger tubes 48. The cooling tubes 44 and the heat exchange tubes 48, that may be brazed together, form the heat exchanger 45 that can provide a surface-to-surface exchange of heat. It will be understood, however, that air traveling in the channels 50 between the heat exchange tubes 48 may also become heated due to the heat transferred from the heat exchange tubes 48 to the air in the channels 50.

Referring further to FIG. 3, according to various embodiments the fuel injector ports 60 are formed in the main injector 52. The injector ports 60 may be provided in any appropriate number. According to various embodiments, there is a ratio of heat exchange tubes 48 to injectors 60 of at least four to one. It will be understood, however, that any appropriate ratio of the injectors 60 to the heat exchange tubes 48 may be provided. The fuel is provided to the manifold region 56 which is bound by the intra-propellant plate 54, the main injector plate 52, and a manifold plate 61. The manifold plate 61 may underlay, overlay, or surround the manifold region 56. This provides fuel to each of the injector ports 60 without requiring an individual fuel line to each injector port 60. Therefore, as air exits each heat exchange tube 48, fuel is injected from the injector port 60 into the stream of air emitted from each heat exchange tube 48. In this way, the fuel can be very efficiently and quickly distributed throughout the air flowing from the heat exchanger 45, as discussed further herein.

As discussed above, an ignition system 18 may be provided to allow an ignition of the combustor 14. The ignition system 18 that includes the combustion wave premix chamber 20 that allows for the transmission of the combustion wave along the ignition line 22 (a portion shown enlarged in FIG. 3 for clarity only) to a pilot port 62 that may be formed in the main combustion chamber 34. As illustrated particularly in FIG. 3, the pilot port 62 may extend a distance into the main combustion chamber 34. As described herein, a selected fuel and oxidizer may be transmitted to the pilot port 62, such that the combustion wave may combust the oxidizer and fuel being provided to the pilot port 62. As mentioned above and described further herein, although the oxidizer that exits the catalyst tubes 48 is generally at an auto ignition temperature during certain periods and selected times of operation of the turbine 10 or the combustor 14, the oxidizer may not have reached the auto ignition temperature. Therefore, it may be selected to provide the pilot port 62 that may allow a pilot flame to assist in igniting the oxidizer and fuel mixture formed in the main combustion chamber 34. This allows the combustion of the fuel in the main combustion chamber 34 even if the oxidizer being emitted from the catalyst tubes 48 has not yet reached the auto ignition temperature.

On the interior walls of each heat exchange tube 48 is disposed a coating of a catalyst. The catalyst may be any appropriate catalyst that is able to combust or assist in combustion of the fuel, and may include, for example, platinum, palladium, or mixtures thereof. The catalyst is able to combust the fuel without the presence of a flame or any other ignition source. The catalyst is also able to combust the fuel without generally involving any side reactions. Therefore, the combustion of the fuel does not produce undesired products. It will be understood that if the fuel is not a hydrocarbon then the appropriate catalyst may be different or the same. The catalyst allows combustion of the fuel without an additional heat source.

Figure 4:
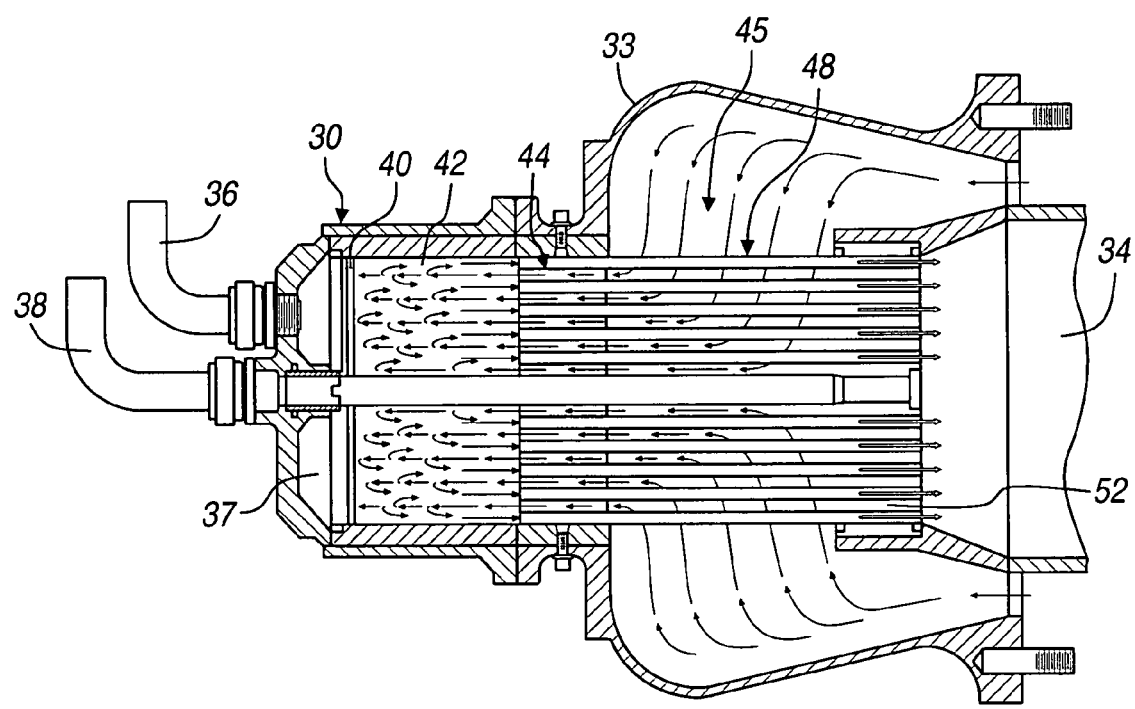
FIG. 4 is a simplified diagrammatic view of the flow of air through the combustion chamber according to a first embodiment of the present invention.

With continuing reference to FIGS. 1-3 and further reference to FIG. 4, a method of using the combustion chamber 14 according to various embodiments will be described. The combustor 14 includes a pre-mixer 42 which may be formed in any appropriate manner. The pre-mixer 42 may include an open region, as illustrated in FIG. 4. The premixer 42 may alternatively include any other appropriate structures. For example, the cooling tubes may extend into the premixer 42 and include orifices or outlets that allow the oxidizer to exit into the premixer 42. It will be understood, therefore, that any appropriate structure may be provided in the premixed chamber 42 that allows the oxidizer to mix with a selected volume of fuel before entering the catalyst tubes 48. When an open region is used as the pre-mixer 42 the flow generally follows the path indicated by the arrows in FIG. 4. It will also be understood that a plurality of tubes, as described above, are present in the heat exchanger, but have been removed for clarity in the present description of the air flow.

Atmospheric air is compressed in the compressor 12 and then introduced into the heat exchange chamber 33 at a high pressure. The air that enters the heat exchange chamber 33 is directed by the directing fins 33a to the top and bottom of the heat exchange chamber 33 so that the air may flow through the channels 50. The air that enters the heat exchange chamber 33 may be at a temperature of about 37° C. to about 427° C. (about 100° F. and about 800° F.). Generally, however, the air enters the heat exchanger 45 at a temperature of about 204° C. to about 400° C. (about 400° F. to about 750° F.).

As the air travels in the channels 50, the air increases in temperature to become "hot" air. The hot air flows through the pathway formed by the cooling tubes 44, which may also be referred to as a cooling tube pathway, and into the premix area 30. The hot air also receives thermal energy while flowing through the cooling tubes 44. It will be understood that the cooling tubes 44 are adjacent a portion of the heat exchange tubes 48. The temperature of the hot air, as it enters the premix area 30, may be about 427° C. to about 538° C. (about 800° F. and about 1000° F.). The air in the premix area 30 makes a turn within the premix chamber 42. As the air turns inside the premix chamber 42, the premix injector 40 injects fuel into the air, entraining the fuel in the air. Again, any appropriate injector may be used to inject the fuel from the premix injector 40 into the premixer 42. For example, a plurality of ports or a selected injector element may be provided to allow for the injection of the fuel into the premixer 42. It will be understood that any appropriate injector may be used. About 30% to about 60% of all the fuel used to power the gas powered turbine 10 is entrained in this manner in the premix chamber 42.

After the air enters the premix chamber 42, it may flow out through the pathway formed by the heat exchange tubes 48. In the heat exchange tubes 48, the fuel in the air combusts as it engages or reacts with the catalyst that is disposed on the inside walls of the heat exchange tubes 48. The catalyst may be disposed within the heat exchange tube 48 in a plurality of ways such as coating by painting or dipping or by affixing seals to the internal walls. As the fuel combusts, the temperature of the air may rise to about 768° C. to about 930° C. (about 1400° F. to about 1700° F.). As the temperature of the air rises, it becomes highly energetic to form high energy air and may then exit the heat exchange tubes 48. The temperature that the high energy air reaches in the heat exchange tubes 48 is at least the hypergolic or auto-ignition temperature of the fuel being used in the gas powered turbine 10. Therefore, the high energy air that exits the heat exchange tubes 48 is, and may also be referred to as, hypergolic or auto ignition air. The auto-ignition temperature of the air is the temperature that the air may be at or above so that when more of the fuel is injected into the hypergolic air the fuel ignites automatically without any other catalyst or ignition source.

Additional fuel is injected through the main injector 52 as the oxidizer exits the heat exchange tubes 48 and enters the main combustion section 34. The fuel injected from the main injector 52 is injected through the injector ports 60. Any ratio of injector ports 60 to heat exchange tubes 48 may be used as long as all of the air exiting the heat exchanger 45 is thoroughly mixed with fuel. Also, as discussed above, any appropriate injector element or design may be used to mix the fuel with the oxidizer. Any additional fuel to power the gas powered turbine 10 is injected at this point, such that fuel is added to the air at the premix chamber 42 and from the injector ports 60.

As the air travels through the heat exchange tubes 48, the fuel that was entrained in the air in the premix chamber 42 may be at least partially combusted by the catalyst. This raises the temperature of the air from the temperature that it enters the heat exchange chamber 33. In particular, the temperature of the air may be raised to about 700° C. to about 880° C. (about 1300° F. to about 1600° F.). This temperature, or the selected temperature reached in the catalyst tubes 48, is generally the hypergolic temperature of the fuel so that the fuel combusts spontaneously when added through the injector port 60. It will be understood that different fuels have different hypergolic temperatures. Therefore, the amount of fuel added in the premix section 42 may be altered to determine the temperature of the air exiting the heat exchange tubes 48.

Returning reference to FIG. 3, the heat exchange tubes 48 extend from an upstream side 70 through the intra-propellant plate 54 and terminate into the main injector 52. A face of the injector 52a is downstream of the heat exchange tubes 48. Fuel may be provided through the main fuel line 38 to the manifold region 56 which is the area between the intra-propellant plate 54 and the main injector 52. Although only one main fuel line 38 is illustrated, it will be understood that more than one main fuel line may be provided. Formed in the main injector plate 52 are oxidizer passages or pathways 72 which are extensions of the heat exchange tubes 48 formed in the main injector plate 52. The hypergolic air from the heat exchange tubes 48 passes through the oxidizer pathways 72 and exits into the main combustion area 34. Extending back from the injector port 60 may be a fuel injection path 74. Each fuel injector port 60 may include at least one fuel pathway 74. The fuel pathway 74 may be a bore formed in the main injector plate 52 to allow access between the fuel manifold region 56 so that the fuel which is provided to the fuel manifold region 56 from the main fuel line 38 can reach the combustion area 34. Generally, the fuel pathways 74 may be formed in the main injector plate 52 and the spaces or lands between the oxidizer pathways 72 which extend from the heat exchange tubes 48. Various pathways 74 may be formed to achieve appropriate results, such as those described in U.S. patent application Ser. No. 10/729, 595, entitled "A Catalytic Combustor and Method for Substantially Eliminating Various Emissions", incorporated herein by reference. Although any other appropriate injector element may be used.

The injectors 60 may also allow a substantial intermixing of the fuel with the air exiting the oxidizer pathways 72 before the fuel combusts so that the combustion in the combustion chamber 34, across the face of 52a of the main injector plate 52 is substantially even. This generally does not allow hot spots in the combustion area 34 to form, thereby substantially eliminating the production of NOX chemicals.

During portions of operation the air that exits the heat exchanger 45 may be at the auto-ignition or hypergolic temperature of the fuel used in the gas powered turbine 10. Therefore, as soon as the fuel reaches the temperature of the air, the fuel ignites. Since the fuel may be thoroughly mixed with the air, the combustion of the fuel is nearly instantaneous and may not produce any localized or discrete hot spots. Because the fuel may be well mixed with the air exiting the heat exchanger 45, there is no one point or area which has more fuel than any other point, which could also create hot spots in the main combustion section 34. Therefore, the temperature of the air coming from the main injector 52 and into the main combustion section 34 is substantially uniform. During operation of the gas powered turbine 10, the fuel's characteristic mixing rate is faster than the combustion rate of the fuel.

The temperature of the air, after the additional fuel has been combusted from the main injector 52, may be about 1315° C. to about 1537° C. (about 2400° F. and about 2800° F.). Preferably, the temperature, however, is not more than about 1426° C. (about 2600° F.). Different fuel to air ratios may be used to control the temperature in the main combustion section 34. The main combustion section 34 directs the expanding gases into a transition tube (shown in part extending from the combustion section 34) so that it engages the turbine blades 16 in the turbine area 15 at an appropriate cross sectional flow shape.

The use of the heat exchanger 45 raises the temperature of the air to create hot or heated air. The hot air allows the catalyst to combust the fuel that has been entrained in the air in the premix chamber 42 without the need for any other ignition sources. The catalyst only interacts with the hydrocarbon fuel and the oxygen in the air to combust the fuel without reacting or creating other chemical species. Therefore, the products of the combustion in the heat exchange tubes 48 are substantially only carbon dioxide and water due to the catalyst placed therein. No significant amounts of other chemical species are produced because of the use of the catalyst. Also, the use of the heat exchange tubes 48, with a catalyst disposed therein, allows the temperature of the air to reach the auto-ignition temperature of the fuel so that no additional ignition sources are necessary in the main combustion section 34. Therefore, the temperature of the air does not reach a temperature where extraneous species may be easily produced, such as NOX chemicals. Due to this, the emissions of the gas powered turbine 10 of the present invention has virtually no NOX emissions. That is, that the NOX emissions of the gas powered turbine 10 according to the present invention are generally below about 1 part per million volume dry gas.

Also, the use of the heat exchanger 45 substantially eliminates the need for any other pre-burners to be used in the gas powered turbine 10. The heat exchanger 45 provides the thermal energy to the air so that the catalyst bed is at the proper temperature. Because of this, there are no other areas where extraneous or undesired chemical species may be produced. Additionally, the equivalence ratio of the premix area is generally between about 0.20 and 0.30, while the equivalence ratio of the main injector 52 is between about 0.50 and about 0.60. This means that the fuel combustion will occur as a lean mixture in both areas. Therefore, there is never an excessive amount of fuel that is not combusted. Also, the lean mixture helps to lower temperatures of the air to more easily control side reactions. It will be understood that different fuel ratios may be used to produce different temperatures. This may be necessary for different fuels.

The catalyst positioned in the catalyst tubes 48 may be able to combust a selected fuel at a selected temperature. At least, it will be understood that the catalytic activity of the catalyst may reach an optimum or first order of reaction at a selected temperature, but may include a less optimum reaction at a different temperature. For example, and not intended to be limiting, if the fuel is natural gas to power the gas powered turbine 10, the catalytic activity for various selected catalyst may be substantially below optimum or desired catalytic activities at the temperature of the air that enters the catalytic tubes 48 during start-up. That is during start-up, the temperature of the air reaching the catalytic tubes 48, as discussed above, is generally about 37° C. and generally not greater than about 200° C. (98° F. to 390° F.).

The oxidizer that may be used to oxidize the fuel, so that the fuel combusts, is atmospheric air that is drawn in through the compressor 12 into the gas powered turbine 10. Although any appropriate oxidizer may be used, such as liquid oxygen. The air may not be heated and is substantially near room temperature or ambient temperature when the air is drawn in to be compressed with the compressor 12. Although the action of being drawn in and compressed with the compressor 12 may increase the temperature of the air, it still may not reach the optimal temperature for reacting the fuel with the catalyst. Therefore, it may be selected to provide a start-up heating apparatus near the catalytic tubes 48. For example, electric coils or induction coils may be positioned around or near the catalytic tubes 48 to heat the catalytic tubes 48 to a selected temperature. In addition, the air that is compressed with the compressor 12 may be heated to a selected temperature to react with the catalyst in the catalytic tubes 48.

Alternatively, or in addition to heating the air before it enters the catalytic tubes 48, particularly at start-up, a fuel that may have a higher kinetic energy on the catalyst on the catalytic tubes 48 may be used at start-up to achieve a selected temperature of the catalytic tubes 48. For example, hydrogen gas may be used during start-up to power the gas power turbine 10. As discussed above, hydrogen may be the fuel that is selected to combust in the oxidizer. In addition, two fuels may be used during a single operating procedure to achieve a selected operating condition. For example, hydrogen alone may be used to initially heat the catalytic tubes 48 and achieve a selected operating temperature and then a mixture of hydrogen and other selected fuels such as methane may be used for continuous operation or as an intermediary to a pure hydrocarbon or other selected fuel.

Nevertheless, using the gaseous hydrogen as the start-up fuel increases the kinetic activity thereby decreasing the temperature that the catalytic tubes 48 must be at to achieve an optimum reaction of the fuel with the oxidizer. Because the hydrogen may be able to react at a lower temperature, yet optimally, with the catalyst in the catalytic tubes 48, the reaction may be able to heat the catalytic tubes 48 to a selected temperature that may be an optimal reaction temperature of a second fuel in the gas powered turbine 10. Therefore, a different fuel may be used during a start-up phase than a fuel used during a continuous operation or later phase. During the start-up phase, the catalytic tubes 48 are heated to a selected temperature to allow for the optimal operating conditions of the gas powered turbine 10.

The use of two fuels may be used with substantially little difficulty in a single system. For example, and not intended to limit the description, a selected fuel may be natural gas, which may be used as a general and operating fuel, while hydrogen gas may be used as a start-up fuel. During the start-up phase, the gaseous hydrogen may react with the other portions of the gas powered turbine 10 in a substantially similar manner as the natural gas. For example, the hydrogen may be able to mix with the hypergolic air by being injected through the main injector plate 52 in a manner such that the gaseous hydrogen does not produce results that are dissimilar to other selected fuels. For example, a fuel's injection momentum, $G_f$ (ft.-lbm/sec$_2$), at a given heating rate, is defined by the following equation:

$$G_f \propto \frac{\hat{M}_f}{P \Delta H_{c,f}^2} \tag{1}$$

where P is the main combustor compressor pressure (psi), $\hat{M}_f$ is the molecular weight of the fuel (grams/mol) and $\Delta H_{c,f}$ is the fuel's molar or volumetric heat of combustion (BTU/SCF).

The molecular weight and volumetric heating value of natural gas is approximately 16 g/mol and 920 BTU/SCF, respectively. For hydrogen, the molecular weight and volumetric heating value is about 2 g/mol and 300 BTU/SCF, respectively. Using Equation 1, at any given combustor pressure, the fuel momentum is substantially equivalent for the same excess air combustor firing rate. Therefore, the impingement jet mixture geometry may allow for proper mixing for either the natural gas or the hydrogen, so that they may be easily interchanged such that either fuel may be used to achieve substantially the same results in the gas powered turbine 10.

Selected fuels may be substantially mixed with the heated oxidizer before the fuel combusts using various appropriate injectors. That is, that fuels that have substantially equivalent fuel injection momentums, as defined by Equation 1, may be used in similar injectors without changing the injector geometry. Therefore, according to the example described above where natural gas and hydrogen has substantially similar injector momentums, the injector will mix the fuel in a substantially similar manner.

It will be understood, however, that not all combinations of fuels or possibilities may include substantially similar injector momentums. The injector momentum may be easily determined, with Equation 1 or similar calculations or experiments, and if the injector momentum is substantially similar between two fuels or a plurality of fuels, then the injector may not need to be changed or altered to achieve similar or selected mixing. This allows that the combustor 14 may be operated using a plurality of types of fuels without changing any of the physical attributes, such as the injectors, of the combustor 14. This would allow a turbine 10 to remain in operation regardless of the fuel supply being used or available to operate the combustor 14.

Thus, it will be understood that hydrogen need not simply be a start up fuel, and may be a fuel used to operate the combustor 14 during operation. That is a methane fuel source may be available at a certain point in the operating cycle of the combustor and/or a hydrogen fuel source is available during a different operating cycle of the combustor 14. Either of the fuels could be used to operate the combustor 14 without changing any of the portions of the combustor 14. Simply, a different fuels may be run through the combustor 14.

Figure 5:
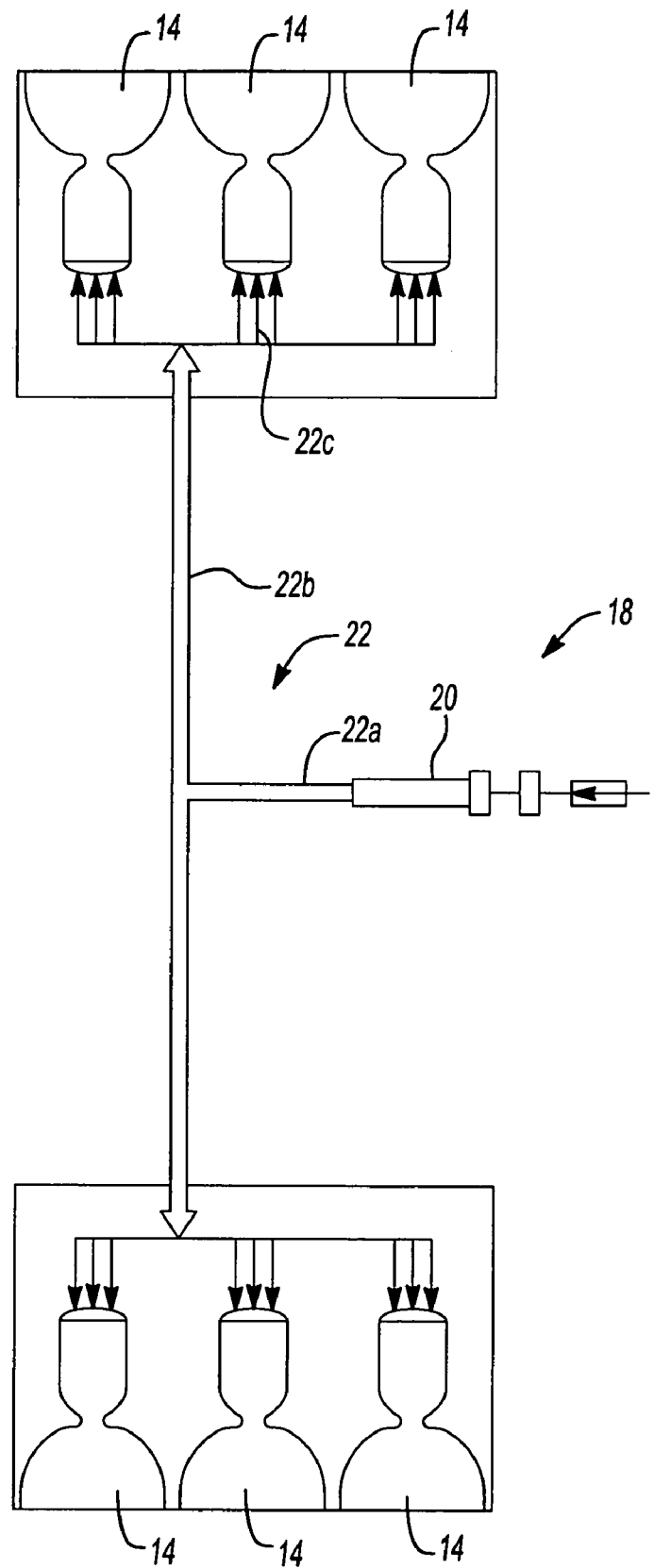
FIG. 5 is a schematic view of an ignition system for simultaneous ignition of a plurality of combustors.

With reference to FIG. 5, a schematic view of the start up system 18 and a plurality of the injectors 14 is illustrated. The premix chamber 20 is interconnected with the ignition lines 22 that divide from the premix chamber 20 to each of the plurality of the combustors 14. As illustrated, the line 22 may branch from a first main line 22a to a secondary line 22b into a plurality of individual lines 22c. It will be understood that any appropriate configuration of lines may be provided and this is merely exemplary. For example, the main line 22a may branch directly to the individual lines 22c rather than having an intermediate line 22b. Nevertheless, generally an individual line 22c will branch from a main line, either directly or indirectly. Therefore, anything emanating from the combustion wave chamber 20 may reach each of the combustors 14 at a substantially simultaneous time. In addition, it will be understood that any number of the combustors 14 may be provided. Simply having six combustors is exemplary and not intended to limit the description.

Also, the combustion wave chamber 20 may be positioned at any appropriate position relative to the combustors 14. For example, the combustion wave chamber 20 may be provided on the turbine system 10 or provided separately therefrom. Simply, the combustion wave chamber 20 allows for a selective portion of a fuel to be combusted in an oxidizer to form a combustion wave as it propagates down the ignition lines 22. This allows the combustion wave chamber 20 to be provided at any appropriate location that may be able to communicate with the ignition line 22 to ignite the combustors 14 at a selected time. Therefore, providing it on the turbine 10 or in close proximity thereto is merely exemplary and may be chosen for various reasons.

Figure 6:
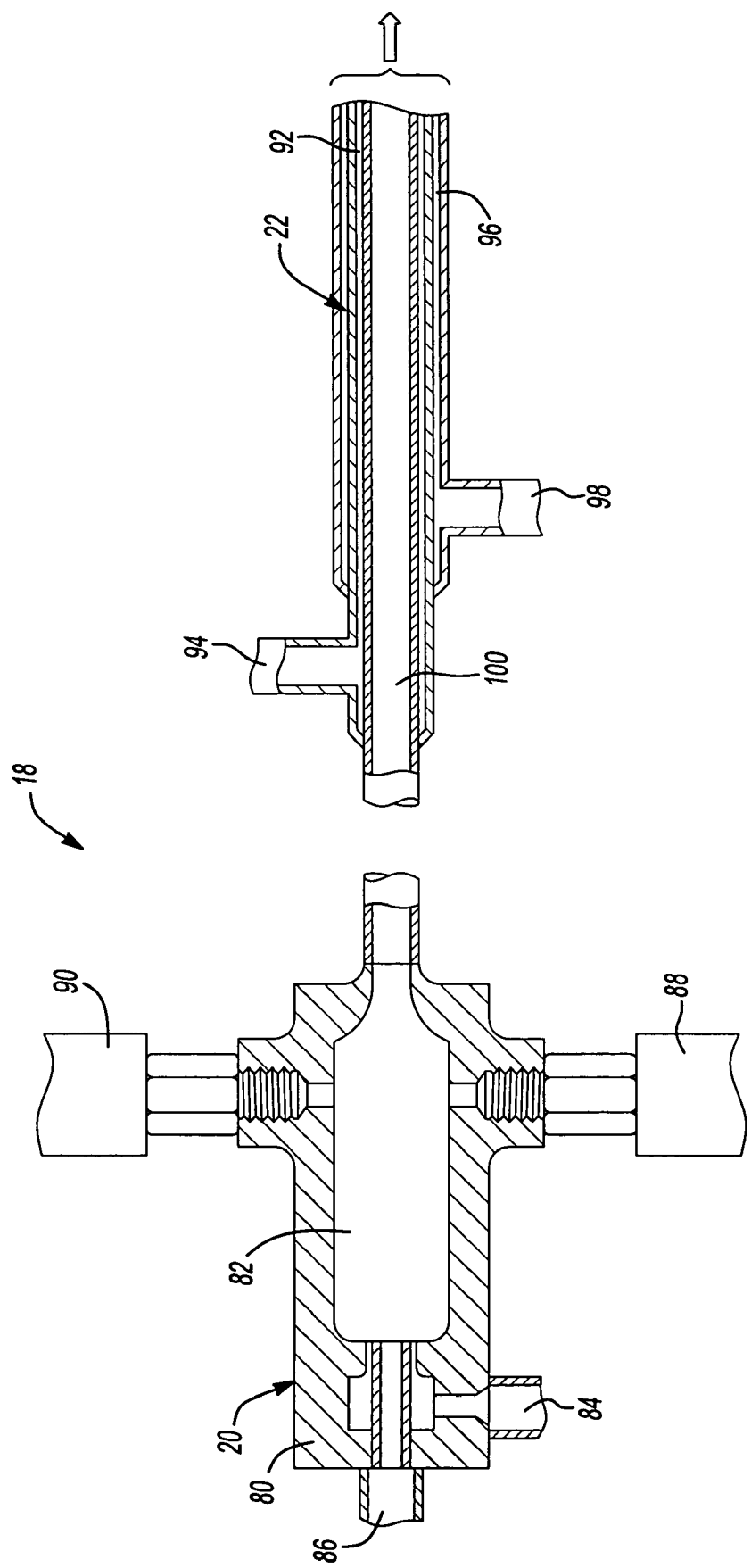
FIG. 6 is a detailed, cross-sectional view of a portion of the ignition system of FIG. 5.

Turning reference to FIG. 6, the combustion wave chamber 20 and a selected portion of the ignition line 22 is illustrated. The combustion wave chamber 20 may be formed with any appropriate material or size, but may include an exterior wall 80. The exterior wall 80 defines a combustion area or chamber 82 in which a selected fuel and oxidizer may combust. A fuel inlet 84 is provided to allow a selected fuel to be inlet into the combustion chamber 82. The fuel may be any appropriate fuel, such as hydrogen or any selected hydro-carbon. For example, hydrogen may be used to allow for a substantially easy ignition and complete ignition of the fuel in the combustion chamber 82. In addition, the hydrogen may substantially eliminate any selected side reactions during the combustion of the fuel. The combustion wave chamber 20 further includes an oxidizer inlet 86. The oxidizer inlet allows an inlet of any appropriate oxidizer, such as liquid or gaseous molecular oxygen. The oxidizer being oxygen is merely exemplary and any appropriate oxidizer may be used. For example, the pure oxygen and the pure hydrogen may mix to substantially produce a selected combustion wave without producing selected side reactions.

Further provided on the combustion wave chamber 20 may be a spark exciter 88. The spark exciter may include a plurality of spark exciters, such as a second spark exciter 90 may also be provided. The spark exciters 88, 90 may be any appropriate exciter, such as a spark plug or other appropriate ignition source. In addition, the spark igniters 88, 90 may be replaced by any appropriate ignition source and does not necessarily require an electrical discharge. The spark exciters are merely exemplary of a selected ignition source.

Once the selected volume of the oxidizer provided from the oxidizer inlet 86 and the fuel provided through the fuel inlet 84 is provided to completely fill combustion chamber 82 and downstream tube 100; the igniters 88, 90 may ignite the mixture to form a first combustion wave, that travels down tube 100 within ignition lines 22. Within a few diameters of tube 100 lengths, the slow deflagration combustion wave speed quickly reaches detonation velocities approaching about Mach 2 to about Mach 4. The gas pressure behind the combustion wave may become about 10 to about 20 times higher than the gas pressure in front of the wave. It is generally known in the art that selected mixtures of selected oxidizers and fuels may form a detonation wave. For example, the Chapman-Jougeut detonation theory as described in Williams, F. A. Combustion Theory, Addition-Wesley, Reading, Mass. (1965). Therefore, one skilled in the art will be able to determine a selected mixture of oxidizer and fuel to produce the selected detonation wave as it travels down the ignition line 22.

The ignition line 22 may also generally include a selected volume of the fuel and the oxidizer, along which the detonation wave may propagate to the pilot port 62 (FIG. 3). In addition, the ignition line 22 may include a plurality of annuli. A first annulus may be an oxidizer annulus 92. The oxidizer annulus may be provided with a source of oxidizer through an oxidizer annulus inlet 94. Also a fuel annulus 96 may be provided near the oxidizer annulus 92 and provided with a source of fuel through a fuel annulus inlet 98. The fuel and the oxidizer provided through the annuli 96, 92, respectively, provide the oxidizer and fuel source to keep a pilot lit at the pilot port 62 for a selected period of time. The wave formed from the combustion of the oxidizer and the fuel from the combustion chamber 82 propagates down a center annulus 100 in the ignition line 22. Therefore, the detonation wave is provided down a source that is substantially near the sources of the fuel and oxidizer that will be combusted by detonation wave to form the pilot.

According to various methods, the combustion chamber 82 is filled with a stoichiometric volumes of the oxidizer and the fuel. For example, a stoichiometric amount, such that complete combustion of the oxygen and the hydrogen may form a selected product, may be placed in the combustion chamber 82 after the combustion chamber 82 is filled with a selected stoichiometric amount of the oxidizer and the fuel, the igniters 88, 90 may ignite the stoichiometric mixture. Therefore, the amount or volume of the various components, including the oxidizer and the fuel, in the combustion chamber 82 remain substantially stoichiometric, prior to the ignition of the volume in the combustion chamber 82.

After the ignition of the volume in the combustion chamber 82 a deflagration wave is propagated out of the combustion chamber 82 and down the wave transmission portion 100. After a certain number of length over diameters (L/D), the deflagration wave changes to a detonation wave. Generally the detonation wave travels at a speed that is substantially supersonic down the transmission line 22. Once the wave reaches the exit of tube 100, its volume now contains a hot gas at about 1648° C. to about 2760° C. (about 3000° F. to about 5000° F.) and a pressure of about 10 to about 20 times higher than the pressure in combustion chamber 34. This high pressure causes the hot gas in tube 100 to flow into chamber 34 for some period of time and ignite any flammable gas mixture residing there along with the pilot oxidizer and fuel flowing out of annuli 92 and 96.

The fuel and the oxidizer may be transmitted down the annuli 92, 96 prior to the detonation of the mixture in the combustion chamber 82. Therefore, as soon as the detonation wave reaches the pilot port 62, the pilot will be ignited. Because each of the combustors 14 may include a pilot port 62, each of the combustors 14 may be ignited substantially simultaneously. The pilot port 62 may be lit either before or after the oxidizer and the fuel have begun to flow into the combustor 14.

If the pilot is lit before the oxidizer and fuel flows into the combustor 14, then substantially all flashback waves and other stresses may be eliminated. Nevertheless, igniting each of the combustors 14 substantially simultaneously may reduce such effects regardless.

Although the pilot may not be necessary during the operation of the combustor 14, as described above, the oxidizer generally exits the combustor tubes 48 at a hypergolic temperature of the fuel. Nevertheless, during selected procedures, it may be selected to include a pilot. For example, during start up of the turbine 10, it may be selected to provide a pilot to insure that the fuel is able to be combusted in the oxidizer even if the oxidizer has not yet achieved the hypergolic temperature. Therefore, it may be selected to provide the pilot into the combustion chamber 34 during the start up phase.

In addition, during operation of the turbine 10 or the combustor 14, it may be selected, for various reasons, to provide a pilot in the combustion chamber 34. Therefore, it will be understood that the ignition system 18 may be used at any appropriate time and in any appropriate manner. The ignition system 18 allows the single ignition source in the combustion chamber 82 of the combustion wave chamber 20 to provide an ignition to each of the combustors 14 in the turbine 10 substantially simultaneously. This may be done by providing a detonation wave that propagates down the ignition lines 22 to each of the combustors 14 substantially simultaneously.

Figure 7:
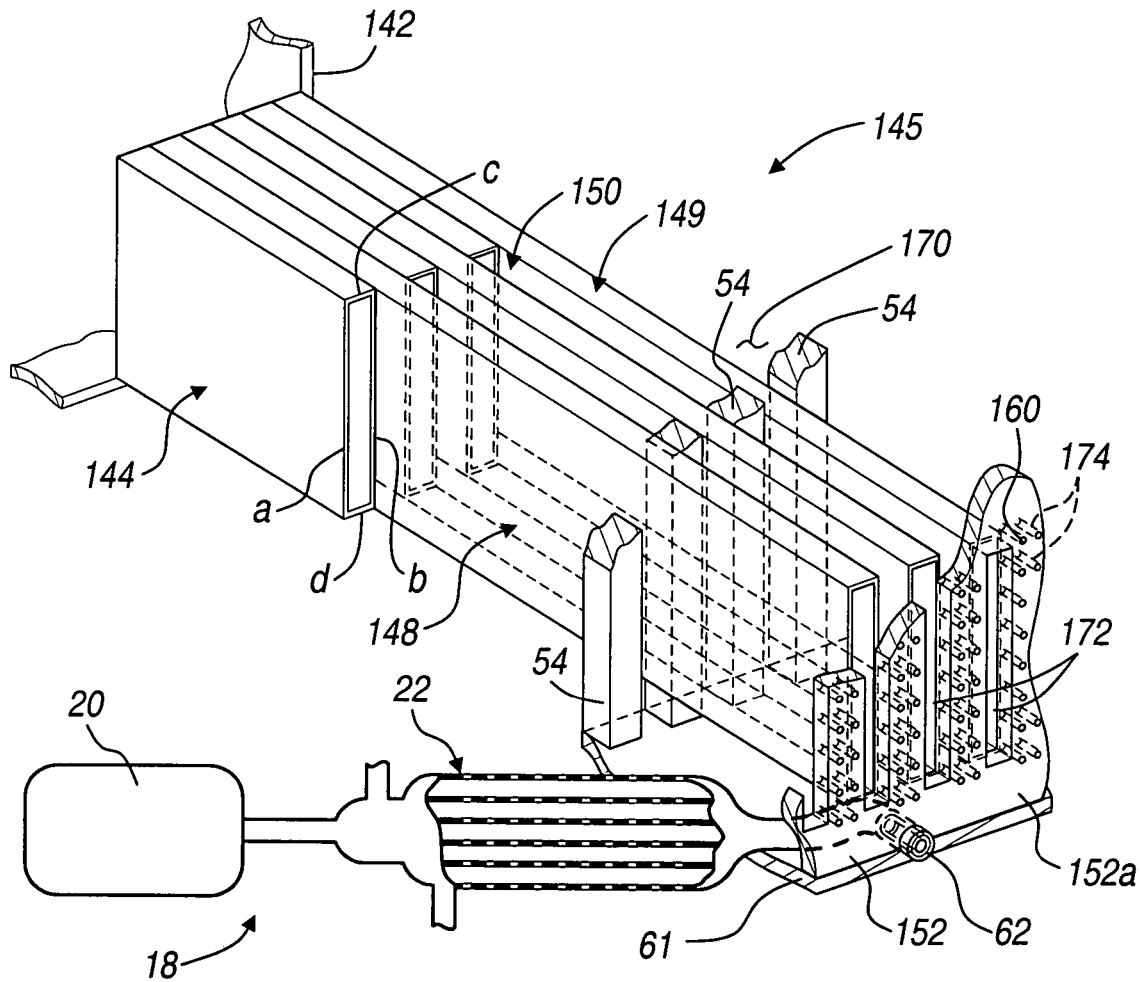
FIG. 7 is a detailed, partial cross-sectional, perspective view of a portion of the heat exchanger according to various embodiments.

With reference to FIG. 7, a detailed portion of the combustor 14, similar to the portion illustrated in FIG. 3, according to various embodiments of a heat exchanger 145 is illustrated. A premix chamber 142 allows air from the compressor to be mixed with a first portion of fuel. Air comes from the compressor and travels through a cooling fin 144 rather than through a plurality of cooling tubes 44, as discussed above in relation to the first embodiment. It will be understood that exit ports may also be formed in the cooling fins 144 to form the premix area 142. The cooling fin 144 is defined by two substantially parallel plates 144a and 144b. It will be understood, however, that other portions, such as a top and a bottom will be included to enclose the cooling fin 144. Additionally, a heat exchange or catalyst fin 148 is provided rather than heat exchange tubes 48, as discussed above in the first embodiment. Again, the catalyst fin 148 is defined by side, top, and bottom walls and defines a column 149. Each catalyst column 149, however, is defined by a single catalyst fin 148 rather than a plurality of catalyst tubes 48, as discussed above. The cooling fin 144 may include a plurality of cooling fins 144. Each cooling fin 144, in the plurality, defines a cooling pathway. Similarly, the heat exchange fin 148 may include a plurality of heat exchange 148 fins. Each, or the plurality of, the heat exchange fins 148 defines a heat exchange or catalyst pathway.

Channels 150 are still provided between each of the catalyst fins 148 so that air may flow from the compressor through the cooling fins 144 into the premix chamber 142. Air is then premixed with a first portion of fuel and flows back through the catalyst fins 148 to the main injector plate 152. Injection ports 160 are provided on the main injector plate 152 to inject fuel as the air exits the catalyst fin 148. A suitable number of injection ports 160 are provided so that the appropriate amount of fuel is mixed with the air as it exits the catalyst fins 148. An intra-propellant plate 54 is also provided.

The injector ports 160 are provided on the main injector plate 152 to provide fuel streams as heated air exits the oxidizer paths 172 from the catalyst fins 148. Any appropriate injector ports may be used with the various embodiments of the heat exchanger 145 to provide a substantial mixing of the fuel with the air as it exits the catalyst fins 148. This still allows a substantial mixture of the fuel with the air as it exits the catalyst fins 148 before the fuel is able to reach its ignition temperature. Therefore, the temperatures across the face of the main injector 152 and in the combustion chamber 34 are still substantially constant without any hot spots where NOX chemicals might be produced.

It will also be understood that the cooling fins 144 may extend into the pre-mixer 142 similar to the cooling tubes 44. In addition, ports may be formed in the portion of the cooling fins 144 extending into the pre-mixer to turn all the air exiting the cooling fins and mix with a first portion of fuel.

It will be further understood that the heat exchanger, according to the present invention, does not require the use of individually enclosed regions or modular portions. Rather the heat exchanger may be formed of a plurality of sheets, such as corrugated sheets. A first set of these sheets may be oriented relative to one another to form a plurality of columns. The first set of sheets include a catalyst coated on a side facing an associated sheet, such that the interior of the column includes the catalyst to contact the airflow. In this way, the catalyst need not be coated on the interior of a closed space, but rather the space is formed after the catalyst is coated to form the catalyst pathway. Operatively associated with the first set of sheets is a second set of sheets, defining a second set of columns disposed at least partially between the first set of columns. Thus, the sheets may form the fins to form the heat exchanger 145, heat exchange columns and cooling columns are formed. These then form the catalyst pathway and the cooling pathway in operation of the combustor.

A pilot port 62 may also extend from the combustor plate 152. As described above, the pilot port 62 may provide a means to ignite a selected fuel as it exits the catalyst pathways 148 and the fuel from the injectors 160. The pilot port 62 is substantially similar to the pilot port 62 in FIG. 3 and may be provided in various embodiments of the combustor or the heat exchanger 145.

Figure 8:
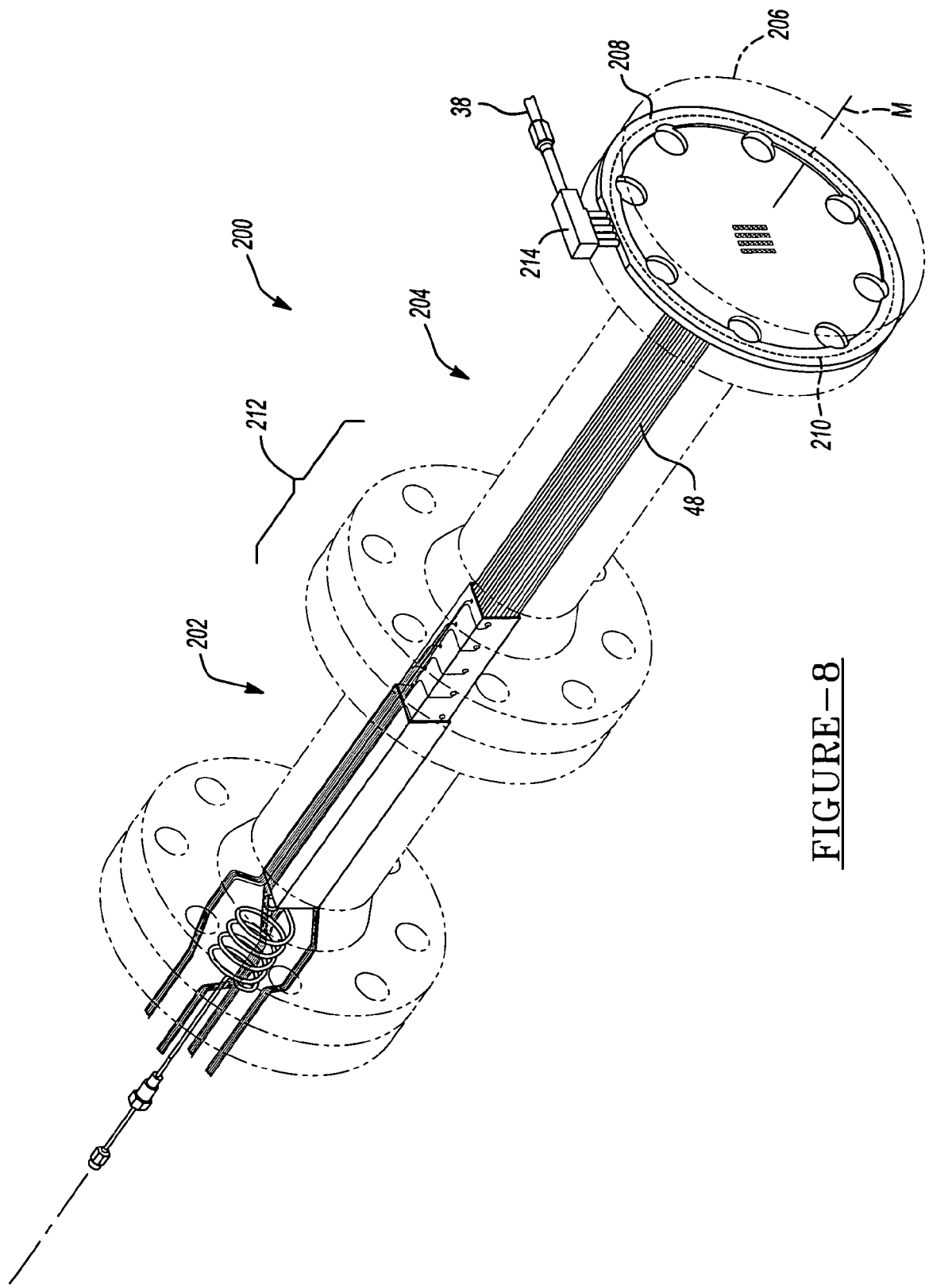
FIG. 8 is a combustor according to a various embodiment.

With reference to FIG. 8, a combustor assembly 200 according to various embodiments is illustrated. The combustor assembly 200 is generally oriented along a central axis M. The combustor assembly 200 may include a pre-mix section 202, a pre-combustion or catalyst section 204, and a main combustion chamber or area 206. The main combustion chamber 206 is generally positioned downstream of an injector plate 208. The injector plate 208 may be at least removable from the combustor assembly 200 for easy changing and testing. The heat exchange tubes 48 also provide a pathway for the hot oxidizer or hypergolic air, or air that becomes hypergolic, before it exits the main injector plate 208. Nevertheless, the heat exchange tubes 48 generally are interconnected with the main injector plate 208 or a seal (not shown) to which the heat exchange tubes 48 are substantially brazed or fixed. The remaining portions of the combustor assembly 200 are substantially similar to the portions illustrated in FIGS. 1 and 2.

The selected oxidizer and a first portion of the fuel is mixed in the pre-mix section 202, in an area of overlap or heat exchange that is formed where the cooling tubes 44 overlap the heat exchange tubes 48 in an overlap section 212. Although the shape of the combustor 200 may be different than the shape of the combustor 14 illustrated in FIG. 2, the purpose and operation may be substantially similar. Nevertheless, the main injector plate 208 may be easily removed from the combustor assembly 200 through a local main fuel supply port 214. The main fuel line 38 is interconnected to the main injector plate 208 through the fuel supply port 214. Therefore, rather than supplying the fuel through the center of the combustor 200, the fuel is provided near the main injection plate 208 for easy removal of the main injector plate 208.

Figure 9:
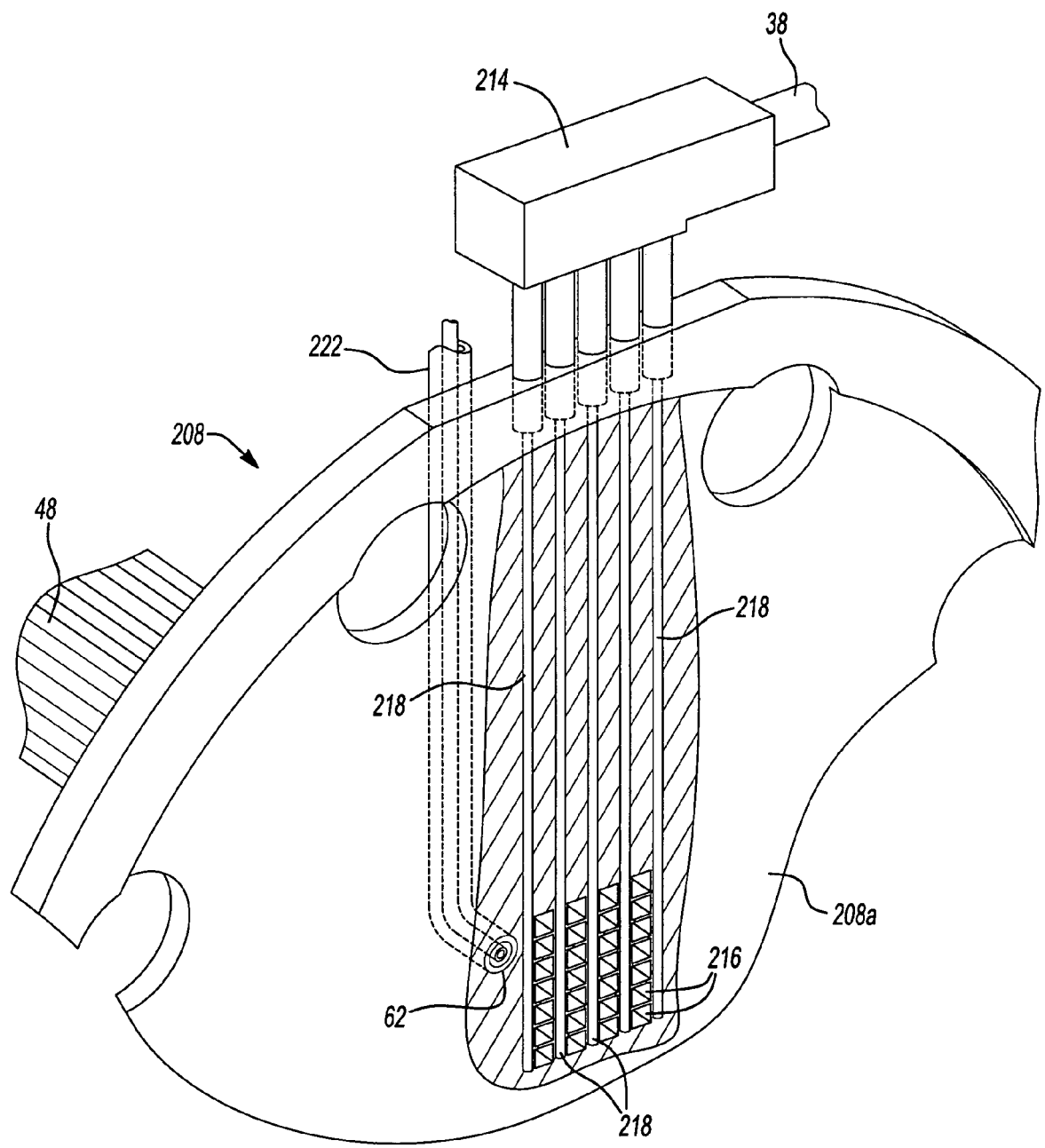
FIG. 9 is a detailed partial cross-sectional perspective of an injector plate according to the embodiment of FIG. 8.

With continuing reference to FIG. 8 and additional reference to FIG. 9, where in FIG. 9 the outer portion of the combustor 200 has been removed to illustrate in detail the main injector plate 208. The main injector plate 208 defines a plurality of oxidizer pathways 216 through which the heated oxidizer flows from the heat exchange tubes 48. The heated oxidizer flows into the main combustion area 206 which is defined as the area downstream of the downstream face 208a of the main injector plate 208. Fuel is provided to the areas between the oxidizer pathways 216 through a plurality of injector plate fuel pathways 218. The main injector plate fuel pathways 218 extend from the fuel port 214 to the areas between the oxidizer pathway 216 to injectors or the injector element 60.

With continuing reference to FIG. 9, the main injector plate 208 defines a plurality of the main injector plate fuel pathways 218 such that fuel may be provided to each of a plurality of areas between the oxidizer pathways 216. The main injector plate 208 defines a thickness appropriate to supply the fuel to the injection areas. The thickness of the injector plate 208 may be any appropriate thickness to meet various requirements. Nevertheless, the injector plate 208 provides the final pathway for the fuel as it flows to the injector areas to be injected into the combustion area 206.

Because the fuel port 214 is interconnected with the injector plate 206, the main fuel line 38 may be disconnected and the injector plate 208 removed from the combustor assembly 200. This may be done for any appropriate reason, such as cleaning the injectors in the injector plate 208, changing the injectors in the injector plate 208, or any other appropriate reason. Therefore, the heat exchange tubes 48 may not generally be fixed to the main injector plate 206, but rather fixed to a seal or second portion that is able to substantially seal with or engage the main injector plate 208 such that the oxidizers provided in the appropriate area.

The pilot port 62 may also be provided in the injector plate 208 substantially similar to those described above. The pilot port 62 may include a plurality of annuli that are defined through the injector plates and extend along a ignition line 222 (a portion shown enlarged in FIG. 7 for clarity only). Therefore, the pilot fuel and oxidizer may be provided along the annuli in the ignition line 222 that may be ignited with the detonation wave that is transmitted along the ignition line 222. These portions may be formed in the main injector plate 208 substantially similar to the lines defined in the fuel inlet lines 218. Nevertheless, the ignition line 222 may be formed at any manner in the injector plates 208. The ignition line 222 may provide a path for the detonation wave to detonate the selected oxidizer and fuel to form the pilot at the pilot port 62. Therefore, regardless of the configuration of the combustor 14, the pilot port 62 may provide a pilot at the combustion chamber in the combustor 14. In addition, the ignition system 18 allows for a substantially simultaneous ignition of a plurality of the combustors 14 without providing for a plurality of ignition sites in the turbine 10. As discussed above, this may eliminate or reduce various occurrences, such as flashback high pressure changes and the like.

The present invention thus provides an apparatus and method that virtually or entirely eliminates the creation of NOX emissions. Advantageously, this is accomplished without significantly complicating the construction of the gas powered turbine 10 or the combustors 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power production system, comprising:
    a combustion oxidizer source to provide a selected volume of a combustion oxidizer;
    a combustion fuel source to provide a selected volume of a combustion fuel;
    a plurality of a combustor to combust the selected volume of the fuel and the oxidizer, wherein combusting the selected volume of the fuel and the oxidizer form expanding gases;
    a turbine powered by the expanding gasses; and
    an ignition system to provide substantially simultaneous ignition of each of the plurality of the combustors,
    said ignition system including a combustion wave chamber to form a detonation wave that can be transmitted through an ignition line with at least one of a selected oxidizer and a selected fuel.

2. The power production system of claim 1, wherein:
    the plurality of the combustors each include a oxidizer pathway that provides a path to provide the oxidizer to main combustion chamber in each of the plurality of the combustors; and
    the selected volume of the combustion fuel is mixed with the selected volume of the oxidizer flowing to the oxidizer pathway to be combusted in the main combustion chamber.

3. The power production system of claim 2, wherein said ignition system includes a pilot that is able to combust the selected volume of the combustion fuel in the selected volume of the combustion oxidizer.

4. The power production system of claim 1, wherein:
    said ignition system includes a combustion wave chamber in which a selected volume of an ignition oxidizer in a selected volume of an ignition fuel is combusted; and
    the combustion of the selected volume of the ignition oxidizer and the selected volume of the ignition fuel forms a detonation wave.

5. The power production system of claim 4, wherein said ignition system further includes an ignition line operable to transmit the detonation wave from the combustion wave chamber to each of the plurality of the combustors substantially simultaneously.

6. The power production system of claim 1, wherein said ignition system includes an ignition line, which includes a central tube to transmit the detonation wave, a first annulus to transmit the selected oxidizer and a second annulus to provide the selected fuel.

7. The power production system of claim 1, wherein:
    said ignition system includes a combustion wave chamber, an ignition line, and a pilot port; and
    said combustion wave chamber is operable to produce a combustion wave that is transmitted along the ignition line to the pilot port.

8. The power production system of claim 1, further comprising an igniter to ignite a selected volume of an oxidizer and a fuel in the ignition system.

9. The power production system of claim 8, wherein said ignition source includes a spark source.

10. A method of igniting a plurality of pilots in a plurality of main combustion chambers, each of said combustion chamber being separated from each of the other main combustion chambers, the method comprising:
    forming a detonation wave;
    transmitting the detonation wave to at least one of the main combustion chambers;

at least one of providing and flowing a selected volume of a pilot oxidizer and a pilot fuel to the main combustion chamber;

igniting the selected volume of the pilot oxidizer and the pilot fuel;

combusting a selected main fuel; and powering a turbine with the combusting main fuel.

11. The method of claim 10, wherein forming a detonation wave includes:

igniting a selected volume of an oxidizer and a fuel, wherein the ignition forms the detonation wave.

12. The method of claim 11, wherein said oxidizer is molecular oxygen and said fuel is molecular hydrogen.

13. The method of claim 11, wherein igniting a selected volume of an oxidizer and the fuel includes spark igniting the selected volume of the oxidizer and the fuel at a selected time.

14. The method of claim 10, further comprising:

forming a deflagration wave; and transmitting the deflagaration wave along a selected length of a transmission line to convert said deflagaration wave to the detonation wave.

15. The method of claim 10, wherein transmitting the detonation wave to the at least one of the main combustion chambers includes transmitting the detonation wave to a plurality of the main combustion chambers substantially simultaneously.

16. The method of claim 15, wherein transmitting the detonation wave to a plurality of the main combustion chamber substantially simultaneously ignites a plurality of pilots substantially simultaneously.

17. The method of claim 16, wherein each of the plurality of the pilots combust the selected main fuel substantially simultaneously in the plurality of the main combustion chambers.

18. A power production system, comprising:

a combustion oxidizer source to provide a selected volume of a combustion oxidizer;

a combustion fuel source to provide a selected volume of a combustion fuel;

a plurality of a combustor to combust the selected volume of the fuel and the oxidizer, wherein combusting the selected volume of the fuel and the oxidizer form expanding gases;

a turbine powered by the expanding gasses; and an ignition system to provide substantially simultaneous ignition of each of the plurality of the combustors, wherein said ignition system includes an ignition line, which includes a central tube to transmit the detonation wave, a first annulus to transmit a selected pilot oxidizer and a second annulus to provide a selected pilot fuel.

* * * * *